H. C. KING.
VEHICLE LIFTER AND SUPPORT.
APPLICATION FILED NOV. 13, 1915.
1,185,104.
Patented May 30, 1916.
3 SHEETS—SHEET 3.
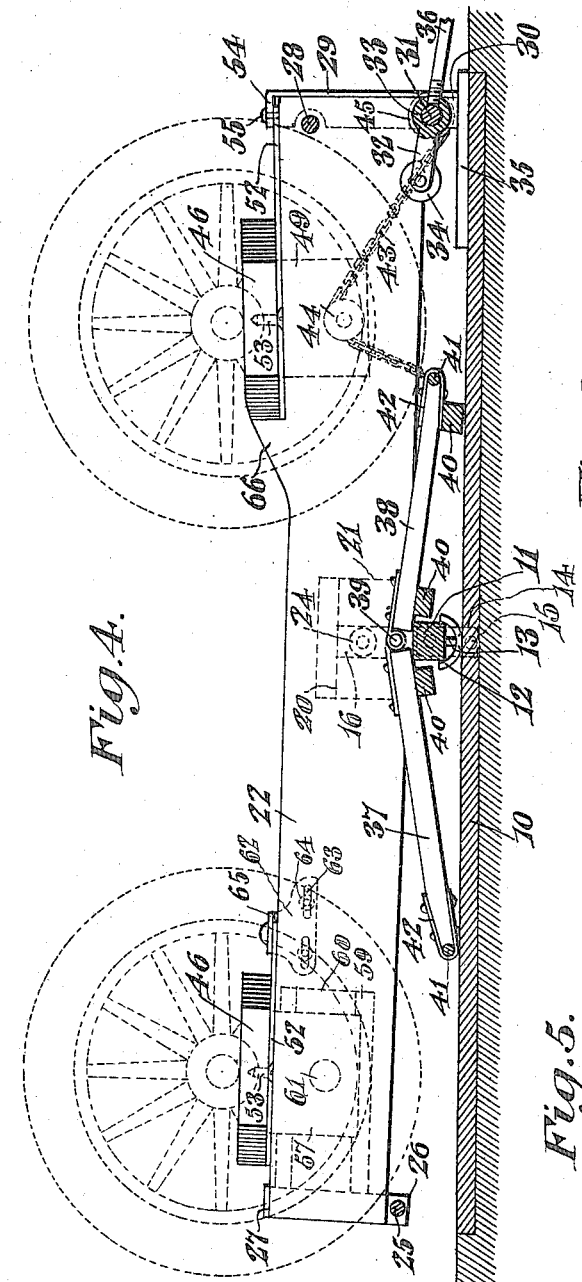
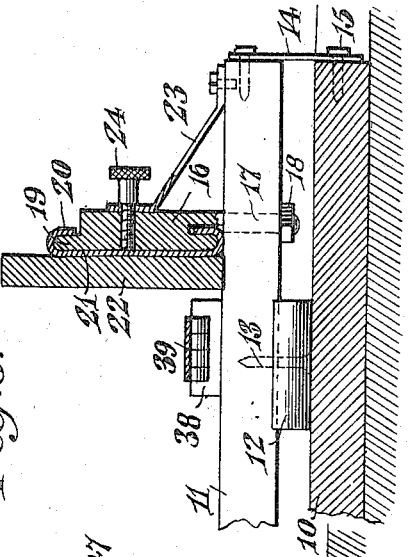
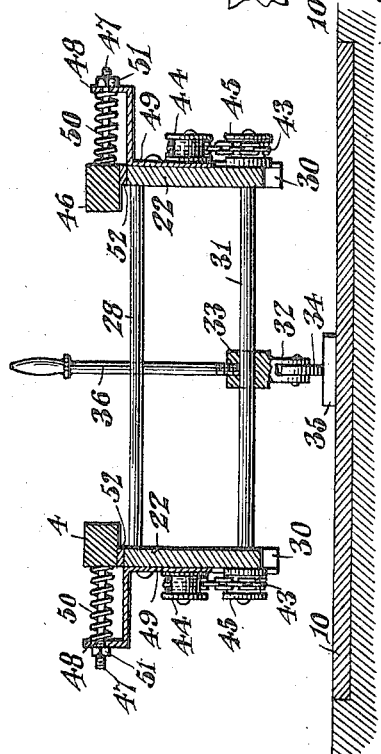
WITNESSES:
Jas. K. McCathran
J.T. Mawhinney
Henry C. King, INVENTOR
BY
Attorney

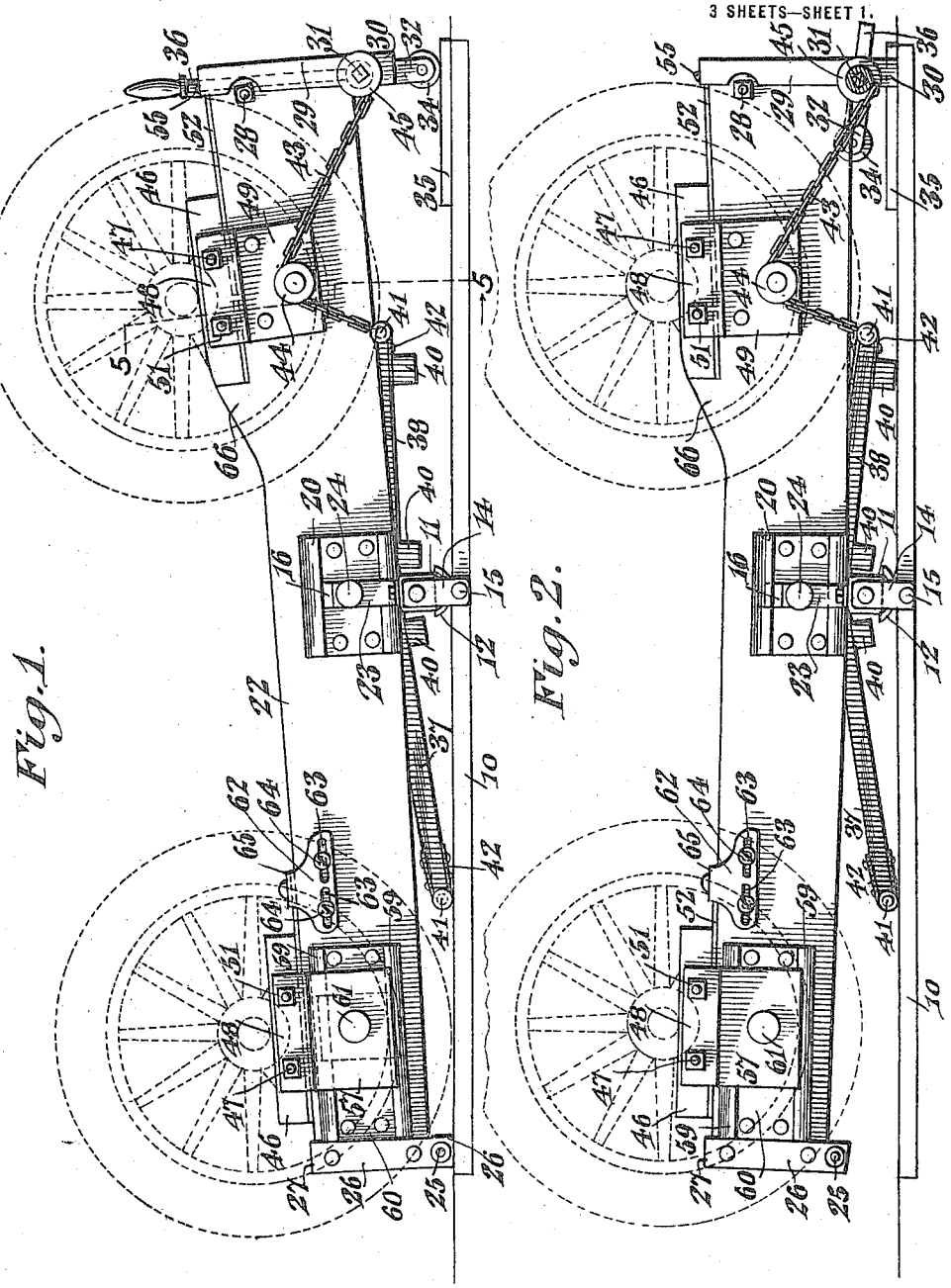

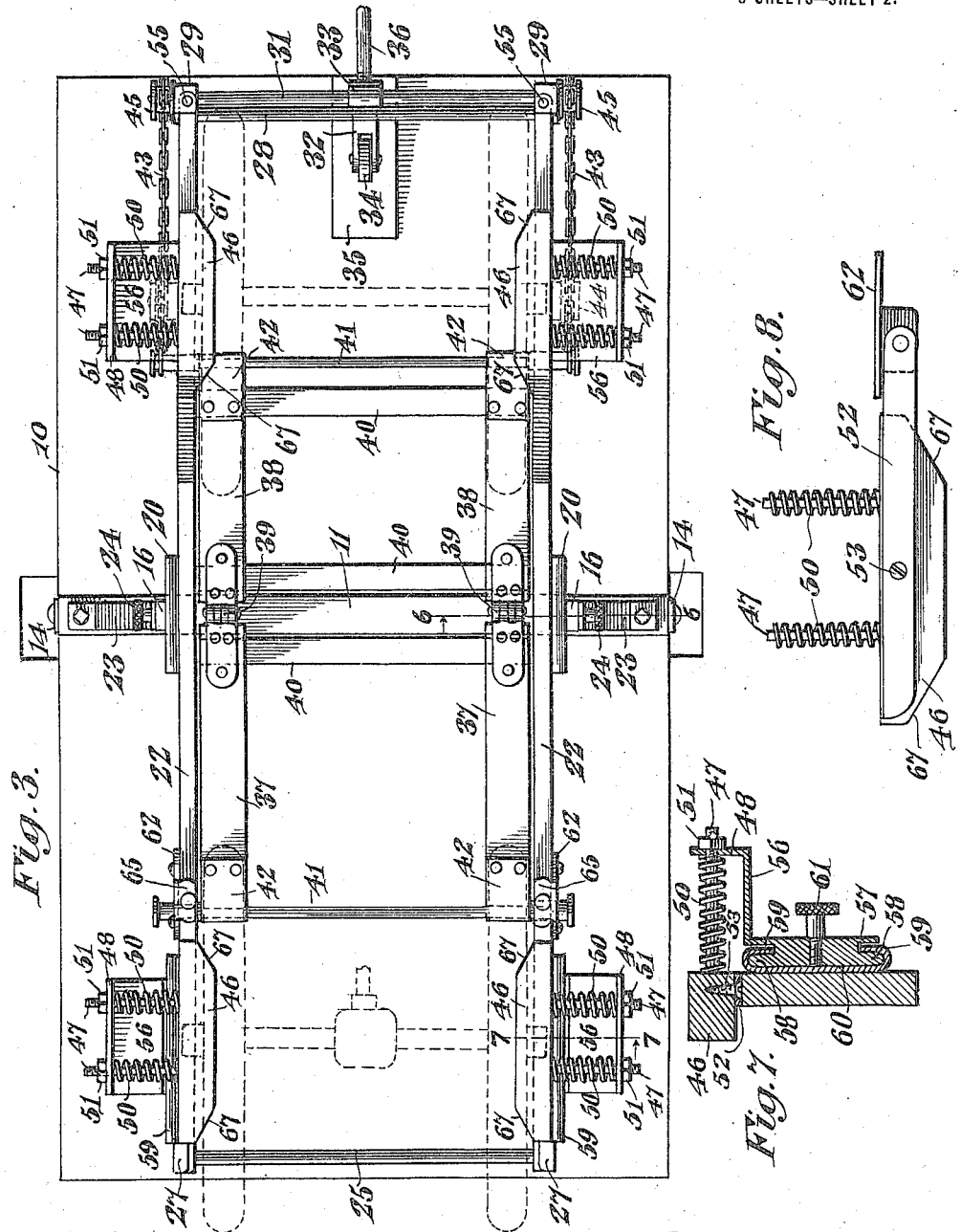

UNITED STATES PATENT OFFICE.

HENRY C. KING, OF WASHINGTON, KANSAS.

VEHICLE LIFTER AND SUPPORT.

1,185,104.   Specification of Letters Patent.   Patented May 30, 1916.

Application filed November 13, 1915.   Serial No. 61,280.

*To all whom it may concern:*

Be it known that I, HENRY C. KING, a citizen of the United States, residing at Washington, in the county of Washington and State of Kansas, have invented a new and useful Vehicle Lifter and Support, of which the following is a specification.

The present invention relates to an improved device for lifting and supporting vehicles when not in use, to relieve the tires of the weight of the vehicle, and has for an object to provide a device of this nature, which supports the vehicle from the outer sides thereof, so as to provide a clearance beneath the vehicle and to prevent contact of the device with brace rods, steering gear, or other mechanism carried beneath the vehicle.

Another object of the invention is to provide a device which will accommodate vehicles of different lengths, which may be adjusted to accommodate vehicles having different weight distributions, and which may be adjusted to operate automatically, and a device which will prevent injury to the chassis and its attachments, and to the running boards, and other protruding parts of the vehicle.

A further object of the invention is to provide a device which will support the vehicle by its hubs, the same being so arranged that the members engaging the hubs project inwardly toward the wheels beneath the hubs, and which are automatically separated or moved outwardly to admit of the passage of the tires and the rims of the wheels into the frame of the device.

The invention has for a still further object to provide a frame which is pivoted, and provided with a lever for holding it in tilted position to receive a vehicle, and to provide an elevating mechanism to lift the vehicle up on the frame, this elevating mechanism being also connected to this single lever so that before the frame is released to swing into a horizontal position, the elevating device is first lowered to place the vehicle on the frame.

The above and various other objects and advantages of this invention will be more clearly brought out in the following detail description of the present preferred embodiment of this invention, the same being disclosed in the accompanying drawings, wherein:—

Figure 1 is a side elevation of the improved vehicle lifter and support, adjusted to receive a vehicle, the dotted lines disclosing the wheels of a vehicle, after it has entered the device. Fig. 2 is a similar view disclosing the device adjusted to support the vehicle above the ground, the frame being disclosed as being freed and the elevating means being shown as lowered. Fig. 3 is a top plan view of the same, adjusted into the position shown in Fig. 2. Fig. 4 is a longitudinal central section, taken through the device in the position shown in Fig. 3. Fig. 5 is a transverse section, taken through the rear end of the device on the line 5—5 of Fig. 1. Fig. 6 is a detail enlarged sectional view through one side of the device, the section being taken centrally on the line 6—6 of Fig. 3. Fig. 7 is a detail sectional view of one of the rear hub supports, taken on the line 7—7 of Fig. 3. Fig. 8 is a detail bottom plan view of one of the hub supports and the adjustable brace carried thereby.

Referring to these drawings, wherein like parts are designated by similar characters of reference throughout the several views, 10 designates a base or floor, upon which the device is supported. This base or floor may be the floor of a garage or the like, wherein it is desired to store the vehicle, and may be counter-sunk or raised with respect to the surrounding floor or ground. The base 10 is provided, at an intermediate point, with a transverse rocker beam 11, provided upon its under side, in preferably spaced relation, with a pair of rockers 12, as clearly shown in Fig. 6, and which are held to the beam 11 by screws 13, or the like. These rockers 12 are adapted to bear upon the upper face of the base 10 and support the beam 11 in transverse relation over the base. The beam 11 is held from sliding or shifting upon the base by means of straps 14 which are pivoted at their upper and lower ends by pins 15 to the base 10, and the ends of the rocker beam 11, as clearly shown. Thus, the straps 14 are permitted movement in a vertical plane to admit of the free rocking motion of the beam 11. The beam 11 is of a length slightly greater than the width of the vehicle to be supported upon the device. Near the opposite ends of the beam, standards 16 are located, the same having depending shank portions 17 passing downwardly through the ends of the beam 11, and are held in place by binding nuts 18 arranged beneath the beam 11. The standards 16 are of substantial width and thickness to withstand the weight of the vehicle, and are provided at their inner sides with transverse tongues 19, at their upper and lower ends, adapted to receive the overturned flanges 20 of pivot plates 21 secured upon the opposite outer faces of beams 22, constituting the main portion or body of the frame of the device. The standards 16 are reinforced by diagonal braces 23 extending outwardly and downwardly from the upper ends of the standards 16 to the outer ends of the beam 11, and are suitably secured at their opposite ends to the respective members. Set screws 24 pass inwardly through the standards 16, and engage at their inner ends against the pivot plates 21, to spread the standards and pivot plates apart and thus bind the tongues 19 within the flanges 20, and hold the beams 22 from shifting longitudinally with respect to the standards 16. It will thus be noted, that the pivotal support of the main frame is adjustable so as to accommodate vehicles of different weight distribution and to admit of the correct adjustment of the frame when the vehicle is placed thereon.

The body or frame of the device is made up chiefly of the side beams 22 which extend lengthwise of the base 10, and which are spaced apart sufficiently to admit of the free passage of a vehicle therebetween. The front or open end of the frame is provided at its lower portion with a transverse brace rod 25, which has its ends fixed in the lower extremities of straps 26, secured vertically upon the outer faces, and at the forward ends of the beams 22. The straps 26 project downwardly from the lower edges of the beams 22 and serve as feet or rests for the frame when tilted forwardly. The upper ends of the straps are overturned upon the upper edges of the beams 22 to provide protecting or reinforcing lips 27 to protect the beams, should the vehicle strike the same.

The rear or opposite end of the frame is provided, at its upper portion, with a transverse brace rod 28 secured at its opposite ends through the beams 22, and spaced inwardly a slight distance from the rear edges of the beams, for a purpose which will hereinafter appear. The rear edges of the beams 22 are protected by angle straps 29 which are secured against the outer faces of the beams, and lapped over against the inner edges thereof, as shown to advantage in Fig. 4. The lower ends of the straps 29 project below the lower edges of the beams 22 and provide feet or rests 30 for the frame, when the same is tilted backwardly to its full extent. Journaled in the rests 30 is a transverse shaft 31 extending across the rear of the frame, and being spaced rearwardly with respect to the brace rod 28. This shaft 31 carries upon its intermediate portion, an operating lever, which is a combined clutch and tilting lever. The lever is made in two parts, a foot portion 32 having a sleeve 33 upon its inner end receiving the shaft 31 therethrough, and upon which the foot portion 32 is hinged. The outer end of the foot portion 32 carries a roller 34 adapted to bear upon a foot piece 35 constituting a wearing plate secured to the upper face of the base 10 at its inner end. A handle portion 36 is threaded into the sleeve 33, preferably in alinement with the foot portion 32 and is adapted to be turned into the sleeve to bind against the shaft 31 and clutch the same, so that the shaft will turn with the lever when the latter is swung about the axis of the shaft. The operating lever, may, therefore, be turned independently of the shaft 31, or may be interlocked with the same so that the shaft and the lever turn as a unit. When the lever is raised into the position shown in Fig. 1, the foot portion 32 is turned downwardly to engage the roller 34 with the wearing plate 35, and thus raise the rear end of the frame, and tilt the forward end thereof downwardly into receiving position. As the brace rod 28 is spaced forwardly from the extremity of the beams 32, the handle 36 of the lever is permitted to swing forwardly past its center, so that the weight of the rear end of the frame tends to press the lever against the brace 28. The brace 28 acts as a stop or rest to hold the lever from forward movement, and thus locks the same.

An elevating mechanism or device is provided to receive the vehicle and lift the same for engagement with the frame or body above described. This elevating device or mechanism comprises a pair of track sections 37 and 38, hinged together at their adjacent ends by strap hinges 39, or the like, the section 37 extending toward the forward open end of the frame, while the inner section 38 projects backwardly within the frame. These track sections are each made up of a pair of rails having flat upper faces to receive the vehicle wheels, and are held rigidly in spaced apart relation by transverse bars 40, which may be of any desired number and configuration suitable to reinforce the elevating or track member. It will be noted that the bars 40, located at the intermediate portion of the track member, are spaced apart a slight distance, and are located at the opposite sides of the hinges 39 to accommodate the rocker beam 11 between the bars 40, and to admit of the positioning of the hinge joint 39 immediately above the rocker arm. Thus, the rear section of the elevating track is pivoted to swing in an arc, the radius of which extends from a center substantially coincident with the pivotal center of the frame. The forward and rear extremities of the track sections 37 and 38 respectively, are reinforced by cross rods 41, secured against the extremities of the rails of the sections by straps 42, which lap over the ends of the rails, and are secured thereto by rivets, bolts, or other suitable fastening devices. These cross rods 41 project considerably beyond the sides of the elevating track, and extend beneath and beyond the side beams 22 of the frame. These cross rods 41 thus hold the opposite free ends of the track sections 37 and 38 from swinging upwardly between the beams to strike the vehicle when passing over the track. The free extremity of the track section 38 is connected to the shaft 31, so that as the shaft rotates in either direction, the track section 38 is raised or lowered beneath the beams 22. To accomplish this result, the extremities of the cross rod 41 of the section 38 are provided with cables, chains, or other flexible members 43, which pass upwardly from the ends of the rod 41 against the outer faces of the beams 22, pass over idlers 44 mounted on the outer faces of the beams 22, and then extend to drums 45 fixed upon the opposite outer ends of the shaft 31. The chains 43 are secured to the drums 45, and when the shaft 31 is rotated to turn the drums 45, the ends of the chains 43 are wound upon the drums and caused to raise the free end of the inner track section 38. The chains 43 are so wound on the drums 45, and are of such length that when the operating lever 36 is raised into the position shown in Fig. 1, not only is the main frame tilted forwardly, as shown, but the chains 43 are wound upon the drums 45, and the inner section 38 of the track is elevated to raise the forward end of the vehicle, as it passes into the frame.

From the above, it will be apparent that the inside of the frame is perfectly clear, so as to have no parts which will engage with the vehicle within its tread, so that no injury can result by the use of this device to the brace rods, axles, or other parts beneath the vehicle. For supporting the vehicle upon the frame, hub blocks or supports 46 are provided, the same being mounted upon the upper edges of the beams 22 to project inwardly beneath the hubs of the vehicle, and support the latter when the elevating track is lowered, or the vehicle delivered to the frame. These hub blocks or supports 46 are in the form of elongated substantially flat members, which are provided with guiding pins 47 projecting outwardly therefrom, and passing through the upturned flange 48 of an adjustable guide plate 49. The pins 47 carry thereon springs 50 preferably surrounding the pins 47, bearing at their inner ends against the blocks or supports 46, and at their outer ends against the flange 48. Stop nuts 51 are secured to the outer ends of the pins 47 and bear against the outer face of the flange 48 to limit the inward projection of the blocks 46, by the action of the springs 50. For the purpose of holding the blocks 46 against movement lengthwise of the frame, brace arms 52 are seated upon the upper edges of the beams 22, and extend longitudinally beneath the blocks 46 to provide a smooth bearing surface for the blocks 46, and are pivotally connected thereto by a screw 53, or the like, to prevent the relative longitudinal movement of the block 46, and the arm 52, and at the same time to admit of the free transverse movement of the blocks 46. One end of each of the arms 52 projects longitudinally beyond the blocks 46 and has pivotal engagement with the beams 22. At the rear end of the frame the opposed brace arms 52 are hinged to lips 54, as shown to advantage in Fig. 4, overturned upon the upper edges of the beams 22 from the upper extremities of the straps 29. Pivot pins 55 pass down through the lips 54 and into the beams 22 to provide a substantial pivotal support for the rear ends of the brace arms 52, and to admit of the lateral swinging of the arms 52 across the upper edges of the beams 22, as the hub blocks 46 are moved back and forth. At the rear end of the frame, the guide plate 49 is secured by screws, rivets, or the like in fixed position against the outer face of the beam 22, the lower portions of each of the guide plates 49 constituting bearings or supports for the idlers 44, which are carried at the inner end of the frame. At the front end of the frame, the guide flanges 48 are carried upon guiding plates 56, which are adjustably mounted upon the outer faces of the beams 22, so as to admit of the adjustment of the outer pair of hub blocks 46 toward and from the rear pair of hub blocks and thus accommodate vehicles of different wheel bases. These adjustable guiding plates 56 are provided at their inner edges with depending base flanges 57, provided upon their inner faces, and at their upper and lower edges, with tongues 58 seating behind guide flanges 59, carried at the upper and lower edges of attaching plates 60, secured against the opposite outer faces of the beams 22. These attaching plates 60 are of an appreciable length, and admit of the longitudinal adjustment of the guiding plates 56 against the outer sides of the beams 22, to thus vary the distance between the forward and rear hub engaging blocks 46. The guiding plates 56 are held rigidly, when adjusted, by means of set screws 61, or the like, which pass inwardly through the depending base flanges 57, and engage at their inner ends against the attaching plates 60.

In Fig. 8 is shown, a detail view of one of the front supporting member assemblies, and wherein the brace arm 52 is pivoted to an adjustable plate 62, the body portion of which is adapted for securement against the outer face of the side beam 22, as shown to advantage in Figs. 1, 2, and 3. It will be noted that the plate 62 is provided with a pair of longitudinally extending openings 63 through which pass set screws 64, passing through the plate 52 and into the side beam 22. By loosening the set screws 64, the attaching plate 52 may be moved longitudinally upon the beam 22 to accommodate the adjustments of the adjacent hub block 46. The upper end of the plate 62 is turned over, as shown in Fig. 3, to provide a supporting flange 65 to which is pivotally connected the outer end of the brace arm 52. Thus, the brace arm 52 is permitted to swing transversely across the upper edge of the side beam 22, and at the same time is permitted adjustments longitudinally of the beam with the front hub blocks 46.

As the rear end of the frame is raised during the entrance of a vehicle within the frame, the side beams 22 are each provided with inclines or hub tracks 66, forming approaches to the hub engaging or supporting blocks 46 at the rear end of the frame, the approaches 66 having their upper or rear ends flush with the upper faces of the blocks 46, or substantially so, so that should the hubs engage the upper edges of the beams 22, the same will ride up upon the approaches 66 and be delivered to the upper supporting surfaces of the blocks 46. It will be noted from Fig. 3, that each of the blocks 46 is provided with beveled or cam faces 67 at each end, the faces being formed on the inner sides of the block. This formation is for the purpose of receiving the tires of wheel rims thereagainst during the entrance or egress of a vehicle with respect to the frame, and forcing these blocks or supports outwardly against the tension of their supporting springs 50, so as to admit of the passage of the tires and rims past the blocks, and to prevent the binding of the blocks against the tires of wheels.

The device may be operated manually or automatically. When the device is operated automatically, the hand lever 36 is loosened within the sleeve 33, by unscrewing the handle 36 slightly, to permit the free rotation of the shaft 31, the unwinding of the chains 43, and the consequent dropping of the rear hinge track section 38. The track section thus lies in the position shown in Figs. 2 and 4, or in its lowermost out of the way position. The operating lever is now turned into the position shown in Figs. 2, 3 and 4, and left idly in such position. Normally, the front or open end of the frame is tilted downwardly, and, as the vehicle passes into the open end of the frame, the tires of the front wheels engage the beveled faces 67 of the front hub blocks 46. This engagement of the hub blocks forces the same outwardly or apart, slides the rods 47 outwardly through the flanges 48 against the tension of the springs 50 and permits the vehicle to pass onward into the frame. The vehicle moves up toward the rear end of the frame, the hubs of the wheels, if they protrude sufficiently, engage the inclines or approaches 66 and depress the rear end of the frame until the front end thereof is raised into engagement with the rear hubs, which now register with the front hub blocks. The rear hubs are thus guided onto the front blocks 46, and tend to force the same down to raise the front hub blocks. It will thus be seen that the track section 38 is not used, but would serve the purpose of supporting the vehicle, should the same, through accident, fall from the rear hub blocks. In order to free the vehicle from the frame, the operating lever is raised into the position shown in Fig. 1, the same still being freed from the shaft 31, and the rear wheels thus brought down into engagement with the base 10. The vehicle may now be backed out of the open end of the frame, the hub blocks 46 being forced back in the same manner as upon the entrance of the vehicle.

The other mode of operation of this device is to interlock or clutch the shaft 31 to the operating handle. The handle is raised to the position shown in Fig. 1, in order to tilt the rear end of the frame upwardly, and to turn the drums 45 to wind the chains 43 thereon, and elevate the rear section 38 of the track. The device is now in position to receive a vehicle. The vehicle is driven in through the forward open end of the frame and up on the track section 38. As above described, the hub blocks 46 are sprung outwardly to admit of the passage of the wheels backwardly into the frame, but snap back into position beneath the hubs of the wheels as soon as the forward parts of the tires and rims pass the blocks. The lever maintains the frame and the track in this tilted or raised position. The handle 36 is now swung rearwardly and downwardly, away from the brace 28, to raise the foot portion 32 of the lever from the wear plate 35, and rotate the shaft 31 to unwind the chains 43. This action frees the frame and at the same time lowers the forward end of the vehicle. The distance between the hub blocks 46 and the base 10 is such that the hubs of the front wheels engage the hub blocks 46 prior to the completion of the downward or lowering movement of the track section 38 so that there will be sufficient clearance between the track section and the tires on the wheels. Thus, the hubs of the front wheels are brought into engagement with the rear end of the frame, swing the same downwardly and raise the front end of the frame to engage the rear wheels of the vehicle. By adjusting the pivotal support of the frame, by means of the pivot plates 21 and the set screws 24, the weight of the vehicle may be properly distributed upon the opposite ends of the frame, the adjustment being such as to accommodate vehicles having different weight distributions.

When it is desired to remove the vehicle from the device, the lever 36 is again raised into the position shown in Fig. 1, to tilt the open end of the frame downwardly, and to lift the elevating track section 38. As the track section 38 is raised, it engages the tires, and lifts the forward wheels up out of engagement with the hub blocks 46. The vehicle may now be driven backwardly down the track sections 38 and 37 respectively, and out of the frame.

It is thus seen that with a structure as above described, the vehicle is supported without bringing any weight supporting parts in contact with the axle, brace bars, steering gear, or any attachments or parts arranged beneath the vehicle, and which are easily broken, bent, or otherwise injured. The present device provides means for supporting the vehicle located and operating wholly outside thereof, by simply engaging the hubs of the wheels. The device is also of such a construction that the fenders, running boards, and other projecting parts of the vehicle are in no wise injured, and do not come into contact with any of the parts of the device.

With the various adjustments above described, the pivotal support of the frame may be changed to suit the varying conditions found in vehicle construction, and the hub blocks may be adjusted to change the distance therebetween, to accommodate vehicles of different lengths.

It is, of course, understood that various changes and modifications may be made in the construction of the above set forth device without departing from the spirit of the present invention, the modifications and changes being restricted only by the scope of the following claims.

What is claimed is:—

1. In a vehicle lifter and support, a tiltable frame, vehicle supports on the frame, an elevating device within the frame to raise the vehicle to the supports, and an operating lever connected to the frame and to the elevating device to tilt the frame to receive the vehicle, and raise the elevating device to deliver the vehicle to the supports, said lever being adapted to be operated to lower the elevating device, and release the frame.

2. In a vehicle lifter and support, a fixed pivotal support, a frame, a connection between the support and the frame, said connection being adapted to be clamped to the frame in various longitudinally adjusted positions, and vehicle engaging devices mounted for longitudinal adjustment on the opposite ends of the frame.

3. In a vehicle lifter and support, a frame open at one end to receive a vehicle, an adjustable pivot support for the frame to balance the same, hub engaging members carried upon the opposite ends of the frame to engage the hubs of a vehicle to support the same, means for tilting the frame forwardly to receive the vehicle, and means for elevating the vehicle for engaging said hub supporting devices.

4. In a vehicle lifter and support, a frame open at one end to receive a vehicle, an adjustable pivotal support for the frame, a lever connected to the frame for tilting the same forwardly, vehicle lifting means within the frame having connection with said lever, whereby to lift the vehicle upon the tilting of the frame, and hub engaging means on the frame for engagement beneath the hubs of the vehicle to support the same upon the release of said frame and said lifting means.

5. In a vehicle lifter and support, an elongated frame open at one end to receive a vehicle, supporting blocks on the frame adapted to register beneath the hubs of the vehicle, and means for actuating the frame to engage said hub supports with the hubs of the vehicle to support the latter.

6. In a vehicle lifter and support, a pivoted frame open at one end, hub supporting devices on each end of the frame, an elevating track within the frame to receive the forward end of a vehicle and raise the same, and a handle pivoted on the frame and having connection with said elevating means for simultaneously lowering the same to lower the hubs of the vehicle upon said hub supporting devices at the closed end of the frame and for freeing the frame to lift the hub supporting devices at the open end thereof into engagement with the rear hubs of the vehicle.

7. In a vehicle lifter and support, a frame open at one end for the reception of a vehicle, hub blocks carried by the frame adapted to project inwardly for engagement beneath the hubs of a vehicle, and block supports projecting said blocks inwardly, and admitting of the retraction of the blocks to permit the passage of the wheel tires and rims past the blocks.

8. In a vehicle lifter and support, a frame open at one end to receive a vehicle, a track within the frame, a lever on the end of the frame to hold the latter in forwardly tilted position, and a connection between the track and the lever to raise the track simultaneously with the tilting of the frame, said lever being adapted to be turned down to release the frame and to lower said track.

9. In a vehicle lifter and support, a pivoted frame open at one end to receive a vehicle, a lever on the closed end of the frame adapted to be raised to tilt the frame forwardly, hub engaging means on the frame adapted to register with the hubs of the vehicle, and an elevating track arranged within the frame to receive the forward end of the vehicle, and raise the same above the closed end of the frame, said track having connection with said lever, said lever being adapted to be turned down to release the frame and to lower the track, whereby the forward end of the vehicle is lowered upon the closed end of the frame and caused to raise the open front end of the frame into engagement with the rear end of the vehicle and lift the same.

10. A vehicle lifter and support comprising a pair of side beams, a rocker beam extending transversely beneath the side beams and having connection thereto, and front and rear pairs of hub engaging blocks carried upon the upper edges of the side beams at the front and rear ends thereof, for engagement with the hubs of the vehicle to support the same upon the frame.

11. In a vehicle lifter and support, a pair of side beams, a rocker beam arranged beneath the side beams, an adjustable connection for securing the side beams to the rocker beam to pivot the side beams thereon, a pair of hub engaging members upon the rear ends of the side beams, and a second pair of hub engaging members on the front ends of the side beams, said pairs of hub engaging members being adjustable longitudinally of the beams toward and from each other, to accommodate vehicles of different wheel bases.

12. In a vehicle lifter and support, a frame open at one end, a support pivotally connected to the frame and adapted for adjustment longitudinally with respect thereto to balance the frame, and a pair of hub engaging members projecting inwardly over the opposite sides of the frame for longitudinal adjustment toward and from each other to accommodate vehicles of different wheel bases, and being retractable whereby to admit of the passage of the vehicle into the frame.

13. In a vehicle lifter and support, a frame, an adjustable pivotal support for the frame, adjustable hub engaging blocks carried by the frame, an elevating track adjustably mounted in the frame, means for raising and lowering the track, and means for tilting said frame.

14. In a vehicle lifter and support, a pair of side beams, a rocker beam arranged beneath the side beams, standards rising from the ends of the rocker beams, pivot plates secured to the sides of the side beams and having longitudinal guide flanges, tongues on the standards engaging said guide flanges, to admit of the longitudinal adjustment of the side beams across the rocker beam, means for securing the standards in adjusted position upon the pivot plates, and means on the side beams for engaging a vehicle to support the same.

15. In a vehicle lifter and support, a rocker beam, standards rising from the rocker beam and having tongues on the inner sides thereof, a pair of spaced apart side beams, pivot plates secured to the side beams and having overturned guiding flanges thereon for the reception of the tongues on said standards, to admit of the longitudinal sliding of the beams across said rocker beam, set screws carried by the standards for engagement against the pivot plates to bind the same to the standards when adjusted, means on the beams for supporting a vehicle, and anchoring straps depending from the ends of the rocker beam to hold the same from slipping during movement.

16. In a vehicle lifter and support, a rocker beam, a frame mounted for longitudinal adjustment across the rocker beam, and spaced apart adjustable vehicle engaging members projecting inwardly from the sides of the frame to support a vehicle thereon and to accommodate vehicles of different lengths, the adjustment of the frame on said rocker beam being adapted to prevent the undue tilting of the frame irrespective of the weight distribution of the vehicle.

17. In a vehicle lifter and support, a frame, an adjustable pivot support for the frame, a pair of hub engaging members at each end of the frame, means for adjusting the hub engaging members toward and from each other to accommodate vehicles of different sizes, an elevating track within the frame adapted to deliver a vehicle to the frame, means for elevating the track, and a handle connected to said track elevating means and to said frame for simultaneously operating the same to raise the track and tilt the frame and to release the frame and lower the track.

18. In a vehicle lifter and support, a frame open at one end, a pivot intermediate the ends of the frame to support the same, a lever hinged to one end of the frame, and having a foot piece for engagement beneath the frame whereby to tilt the same forwardly upon the lifting of the lever, an elevating track within the frame to raise vehicles for engagement therewith, a shaft, drums on the shaft, chains on the drums connected to said lifting member, and a connection between the shaft and said lever adapted to interlock the same and turn said shaft to lift the elevating means upon the tilting of the frame.

19. In a vehicle lifter and support, a frame, an adjustable pivotal mounting for the frame, vehicle engaging means extending inwardly from the frame for engagement against the sides of the vehicle outwardly of the wheels to support the vehicle, an elevating track to raise the vehicle into engagement with the frame, and a single lever connected to the frame and to said elevating track to actuate the same simultaneously for delivering the vehicle to the frame, and for releasing the vehicle from the frame.

20. In a vehicle lifter and support, a frame adapted to be tilted for the reception of a vehicle, a lifting device adjacent the frame for raising a vehicle into engagement with the frame, and a lever connected to the frame and to the lifting device for tilting the frame and raising said lifting device, and for releasing the frame and lowering said lifting device.

21. In a vehicle lifter and support, a pivoted frame, a transverse shaft on one end of the frame, a sleeve on the shaft, a foot section projecting radially from one side of the sleeve and adapted for engagement with the ground beneath the shaft to raise said end of the frame, a handle carried by the sleeve and adapted to be turned therein for engagement against the shaft whereby to bind the shaft in the sleeve to turn with the handle, and vehicle lifting mechanism connected to the shaft to be actuated upon the turning of the shaft.

22. In a vehicle lifter and support, a frame, a shaft on the end of the frame, a lever on the shaft having a foot portion adapted to extend below the shaft to raise the frame, drums on the shaft, a hinged track adjacent the frame, chains carried by the drums and having connection with the track, and a clutch mechanism on the lever for binding the shaft thereto to turn the shaft to elevate the track during the lifting of said end of the frame.

In testimony that I claim the foregoing as my own I have hereto affixed my signature in the presence of two witnesses.

HENRY C. KING.

Witnesses:
F. J. FLETCHER,
C. E. RUST.

Copies of this patent may be obtained for five cents each, by addressing the "Commissioner of Patents Washington, D. C."